(12) United States Patent
Giefer et al.

(10) Patent No.: US 8,752,448 B2
(45) Date of Patent: Jun. 17, 2014

(54) ACTUATING DEVICE WITH AN ADDITIONAL SWITCHING ELEMENT

(75) Inventors: Andreas Giefer, Lemförde (DE); Jörg Meyer, Wagenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 898 days.

(21) Appl. No.: 12/066,858

(22) PCT Filed: Sep. 15, 2006

(86) PCT No.: PCT/DE2006/001645
§ 371 (c)(1),
(2), (4) Date: Mar. 14, 2008

(87) PCT Pub. No.: WO2007/031075
PCT Pub. Date: Mar. 22, 2007

(65) Prior Publication Data
US 2008/0282829 A1    Nov. 20, 2008

(30) Foreign Application Priority Data
Sep. 15, 2005   (DE) .................. 10 2005 044 254

(51) Int. Cl.
*F16H 59/10* (2006.01)
*F16H 59/12* (2006.01)

(52) U.S. Cl.
USPC ..................................... 74/473.12; 74/473.3

(58) Field of Classification Search
USPC ............. 74/473.21, 473.22, 473.23, 473.12, 74/473.1, 473.11–473.19, 473.2, 74/473.24–473.26, 473.3, 473.33, 471 XY; 3/473.21, 473.22, 473.23
See application file for complete search history.

(56) References Cited

U.S. PATENT DOCUMENTS

| | | | | |
|---|---|---|---|---|
| 4,485,694 A | * | 12/1984 | Mochida | 477/99 |
| 4,660,430 A | * | 4/1987 | Bortfeld et al. | 74/335 |
| 4,774,850 A | * | 10/1988 | Shovlin | 74/473.23 |
| 5,220,984 A | | 6/1993 | Ruiter | |
| 5,379,871 A | | 1/1995 | Asano et al. | |
| 5,489,246 A | * | 2/1996 | Moody et al. | 477/96 |
| 5,695,029 A | * | 12/1997 | Yokoyama et al. | 192/219.6 |
| 5,718,312 A | * | 2/1998 | Osborn et al. | 192/220.4 |
| 5,845,534 A | * | 12/1998 | Kim | 74/473.12 |
| 6,694,838 B2 | * | 2/2004 | Ersoy | 74/473.1 |
| 6,695,090 B2 | * | 2/2004 | McAllister | 180/333 |
| 6,993,994 B2 | * | 2/2006 | Giefer et al. | 74/473.24 |

(Continued)

FOREIGN PATENT DOCUMENTS

| | | |
|---|---|---|
| DE | 32 38 219 A1 | 4/1984 |
| DE | 197 47 269 A1 | 4/1999 |

(Continued)

*Primary Examiner* — Alan B Waits
(74) *Attorney, Agent, or Firm* — McGlew and Tuttle, P.C.

(57) ABSTRACT

An actuating device for a technical system, especially for selecting gears of a shift-by-wire speed-change gear. The actuating device includes an actuating element (1), which is movable in relation to a base area (3), with at least two switching positions. At least one additional switching element (5), which acts on a signal transmission (8) with a signal transmitter (6), is arranged at the actuating element (1). The additional switching element (5) and the signal transmitter (8) are connected by a mechanical transmission element. However, the signal transmitter (6) is connected to the base area (3) of the actuating device. The present invention makes it possible to embody a robust additional switching element, which is protected from disturbances, at an actuating element. Mobile and hence susceptible cablings to the additional switching element, which were hitherto necessary, are eliminated.

20 Claims, 4 Drawing Sheets

(56) References Cited

U.S. PATENT DOCUMENTS 7,360,469 B2 * 4/2008 Tomida .......................... 74/537
7,784,375 B2 * 8/2010 Bleckmann et al. ....... 74/473.23

FOREIGN PATENT DOCUMENTS

| | | |
|---|---|---|
| DE | 100 25 357 A1 | 11/2001 |
| DE | 103 15 643 B3 | 10/2004 |
| DE | WO 2004/089677 A2 | 10/2004 |
| EP | 1 464 875 A2 | 10/2004 |
| FR | 2 784 061 A1 | 4/2000 |
| JP | 57192827 U | 12/1982 |
| JP | 5825731 U | 2/1983 |
| JP | 06-331009 A | 11/1994 |
| JP | 2004-17951 A | 1/2004 |

* cited by examiner

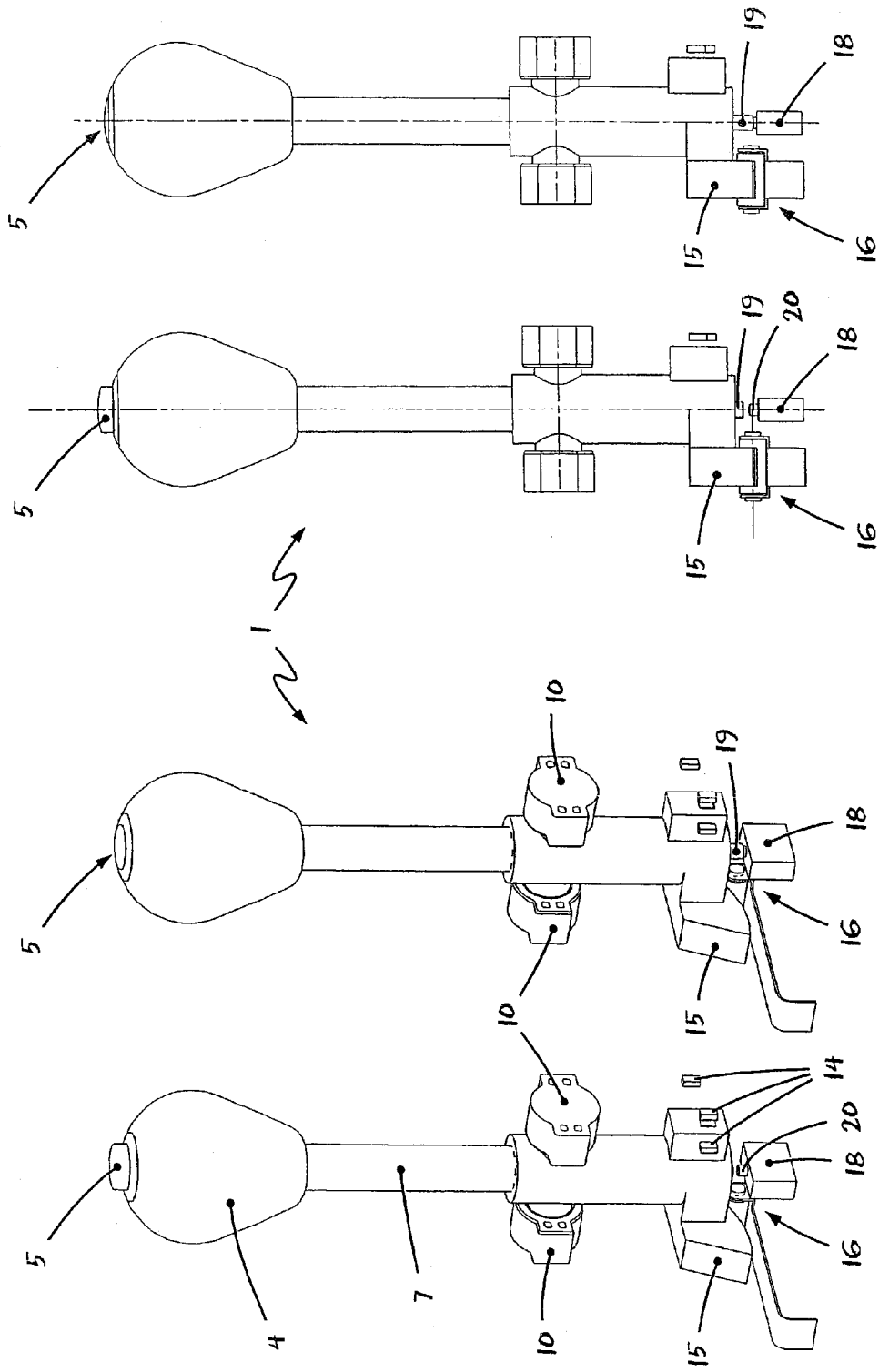

US 8,752,448 B2

ACTUATING DEVICE WITH AN ADDITIONAL SWITCHING ELEMENT

CROSS REFERENCE TO RELATED APPLICATIONS

This application is a United States National Phase application of International Application PCT/DE2006/001645 and claims the benefit of priority under 35 U.S.C. §119 of German Patent Application DE 10 2005 044 254.4 filed Sep. 15, 2005, the entire contents of which are incorporated herein by reference.

FIELD OF THE INVENTION

The present invention pertains to a device for manually controlling or actuating a technical system for example, for selecting gears of a shift-by-wire speed-change gear, the actuating device including an actuating element, which is mobile (movable) relative to a base area, with at least two switching positions, wherein at least one additional switching element is arranged at said actuating element, which additional switching element acts on a signal transmission device with a signal transmitter.

BACKGROUND OF THE INVENTION

Actuating devices of this type are used, for example, but by no means exclusively, for manually selecting gears or for gear preselection in speed-change gears of motor vehicles. Such Actuating device, which may be, for example, an actuating lever arranged between the front seats of a motor vehicle, are frequently equipped with an additional switching element, for example, with a switch, a button or even a sensor, in the area of the lever knob.

Such an additional switching element may be used, for example, to activate or deactivate additional functions besides the main actuation performed with the actuating lever.

It may be, for example, the manual starting or stopping of the internal combustion engine, or, for example, the P position (parking brake) of an automatic transmission can be engaged herewith.

Actuating devices or actuating levers with additional switching elements arranged in the area of the knob are known from the state of the art. Thus, DE 100 25 357 A1 shows a gearshift lever with a switch integrated in the shift knob for actuating additional functions of the motor vehicle.

However, it is necessary with such actuating devices or actuating levers with additional switching elements, which are known from the state of the art, to wire the additional switch, which is arranged, for example, in the knob of the actuating lever, separately, or to install a flexible electrical line connection from the rigid base area of the actuating lever through the actuating lever into the knob area of the actuating lever in order to make it possible to transmit the electrical switching signals of the additional switching element to the respective switching receiver.

However, the electrical line is also moved along in this case during motion of the actuating lever in the area in which the actuating lever is connected to the lever base and is even deformed by bending each time. This continual bending deformation of the electrical line connection between the additional switching element and the lever base may, however, lead to fatigue of the connection cable and ultimately to damage to or failure of the signal transmission between the additional switching element and the switching receiver.

Furthermore, it is necessary already at the time of the mounting of such a prior-art Actuating device with additional switching element that the electrical line between the mobile actuating element and the immobile base area is installed especially carefully, because, on the one hand, the electrical line requires a certain unobstructed free space for the length and motion compensation in the transition area between the actuating element and the base area, and, on the other hand, it must be ensured that the electrical line cannot be clamped between the components of Actuating device, which components are movable in relation to one another, despite the certain mobility that is necessary. However, both require great care during assembly and thus lead to a comparatively complicated and expensive mounting of the prior-art Actuating device with additional switching element.

Finally, the arrangement of an electrical switching element, for example, in the knob of an actuating lever, is likewise not unproblematic, because the electrical switching element is exposed to additional external effects in this case. Such additional external effects, for example, shocks during motion and at the end stop of the operating element, abusive forces, or even intense heating, especially in the motor vehicle, may lead to premature aging or failure of the electrical switching element. However, this is hardly acceptable, especially when such an additional switching element is used for applications that are critical in terms of safety.

SUMMARY OF THE INVENTION

Against this background, the object of the present invention is to provide an actuating device for a technical system, for example, for actuating a speed-change gear, which has an additional switching element and with which the drawbacks of the state of the art can be overcome. In particular, the actuating device shall avoid the problem of a delicate cabling and of the insufficient protection of the electric contact maker, which problem is associated with the arrangement of the additional switching element which is present in the state of the art.

The actuating device according to the present invention comprises, in a manner that is known per se, an actuating element, which can be brought into at least two different switching positions. Furthermore, the actuating device comprises at least one additional switching element, the additional switching element acting on a signal transmission means, which has an, e.g., electrical or electronic signal transmitter.

However, the actuating device is characterized according to the present invention in that the additional switching element and the signal transmission means are connected by means of a mechanical transmission means. However, the signal transmitter is not arranged at the actuating element, but is connected to the base area of the actuating device.

The fastening of the signal transmitter in the base area of the actuating device entails, in other words, that the signal transmitter is both arranged in the base area such that it is protected optimally and, furthermore, the cabling between the signal receiver and the signal transmitter can also be mounted rigidly and immovably as a continuous cabling.

However, the drawbacks of actuating device with signal transmitters arranged in the actuating element, which were already described in the introduction, are thus already eliminated altogether, because, thanks to the mechanical transmission connection between the additional switching element and the signal transmitter means, as well as thanks to the rigid mounting of the signal transmitted at the base, all problems of the actuating device with additional switching element, which are associated with wiring and the arrangement of the signal transmitter and are known from the state of the art, are eliminated.

The present invention is embodied at first independently from the design and the arrangement of the transmission means and the type of the signal transmitter as long as reliable triggering of the switching signal is ensured with the signal transmitter when the additional switching element is actuated.

According to a preferred embodiment of the present invention, the signal transmitter is, however, a Hall sensor. The design of the actuating device according to the present invention with a Hall sensor is advantageous because contactless transmission of the switching signal from the actuating element to the base area of the actuating device or to the signal transmitter is made possible in this manner. The contactless transmission of the switching signal is free from maintenance and wear, and is thus favorable for the long-term and reliable function of the actuating device.

According to other embodiments of the present invention, the signal transmitter is designed as an optical sensor or as a microswitch. An optical sensor has, since it likewise operates in a contactless manner, advantages similar to those of a Hall sensor, while a signal transmitter designed as a microswitch can be embodied, for example, at an especially low cost. Since microswitches also handle a large number of switching cycles, a reliable actuating device with long service life can be embodied in case of the use of a microswitch as well.

The present invention can be embodied regardless of the concrete design and shape of the actuating element as long as it is a mechanical or electromechanical, mobile actuating element. According to preferred embodiments of the present invention, the actuating element is, however, a gearshift lever, a rotary switch or a slide switch. An additional switching element each, which acts in the manner according to the present invention on the signal transmitter arranged in the base area of the actuating device, may be arranged in such actuating elements in the area of the actuating element.

The design embodiment of the additional switching element is at first likewise freely selectable as long as the additional switching element performs during the actuation at least a slight mechanical motion, which can be transmitted to the signal transmission means arranged in the base area of the actuating device by means of the mechanical transmission means.

However, provisions are made according to preferred embodiments of the present invention for the additional switching element to be a pushbutton or a push switch or a rocker-type switch or a slide switch. These embodiments of the additional switching element can be used for a great variety of switching purposes and have the necessary switching path during actuation.

According to another, especially preferred embodiment of the present invention, the actuating element is a selector lever for a transmission of a motor vehicle, for example, for an automatic transmission. The additional switching element is preferably used here to engage the parking brake of the automatic transmission.

According to an alternative embodiment of the present invention, the additional switching element is used to start and/or stop the engine of a motor vehicle. The operating comfort of the motor vehicle is improved in this manner, because there is a close chronological relationship between starting the engine and engaging a gear and they can thus also be advantageously standardized from the viewpoint of operation.

The present invention will be explained in more detail below on the basis of drawings, which represent exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a schematic perspective view of another embodiment of an actuating device;

FIG. 7 is a schematic perspective view of the actuating device according to FIG. 6 in the actuated position of the additional switching element;

FIG. 8 is a schematic rear view of the actuating device according to FIGS. 6 and 7; and FIG. 9 is a schematic rear view of the actuating device according to FIGS. 6 through 8 in the actuated position of the additional switching element.

DESCRIPTION OF THE PREFERRED EMBODIMENTS

Figure 1:
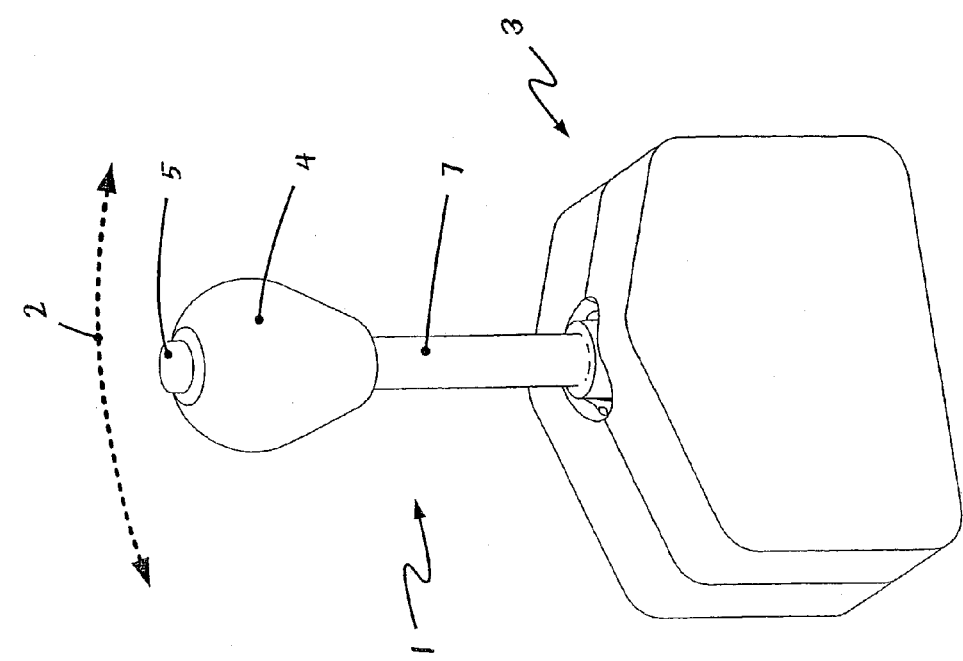
FIG. 1 is a schematic perspective view of an embodiment of an actuating device according to the present invention.

Referring to the drawings in particular, FIG. 1 shows a schematic isometric representation of an embodiment of an actuating device according to the present invention. This exemplary embodiment is an actuating device for an automatic vehicle transmission.

The representation in FIG. 1 shows the actuating element 1, which is designed as a gearshift lever and is arranged such that it can perform a pivoting motion along the broken line 2 relative to a base area 3. The gearshift lever 1 can thus move forward and backward in the direction of travel in order to thus select, for example, the different gears of an automatic transmission.

FIG. 1 shows, furthermore, the additional switching element 5, which is arranged in the area of the knob 4 of the gearshift lever 1 and is designed as a push switch or pushbutton 5 in the exemplary embodiment being shown. Additional functions of the motor vehicle can be controlled with this pushbutton 5; for example, the parking brake of the automatic transmission can be engaged with it, or the engine of the motor vehicle can be started or stopped.

Figure 3:
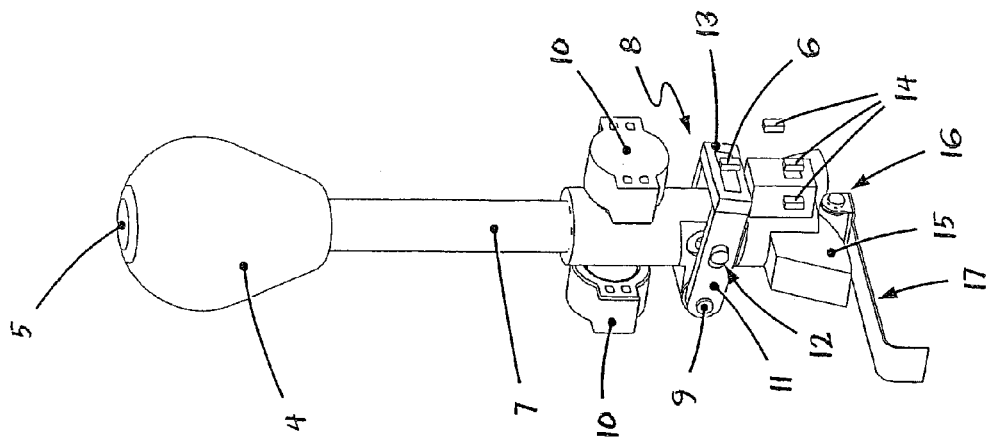
FIG. 3 is a schematic perspective view of the actuating device according to FIGS. 1 and 2 in the actuated position of the additional switching element in a representation and view corresponding to FIG. 2.
Figure 2:
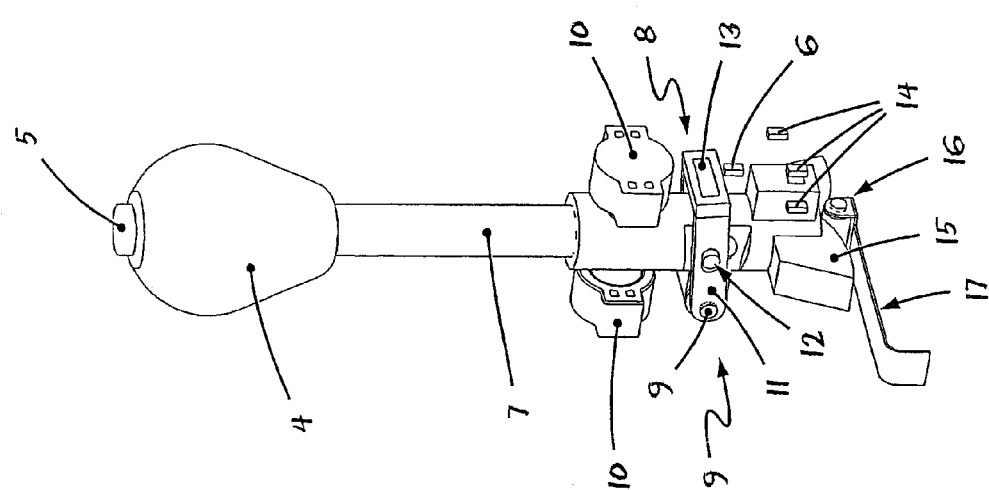
FIG. 2 is a schematic perspective view of an actuating device according to FIG. 1 without the housing in a representation similar to that in FIG. 1.

FIGS. 2 and 3 show the actuating device according to FIG. 1, the housing arranged in the base area 3 of the actuating device having been removed in the representations in FIGS. 2 and 3 in order to make the mode of operation of the transmission means and of the signal transmission means 8 of the actuating device recognizable. The pushbutton 5 arranged in the knob 4 is connected in the embodiment being shown to a U-shaped oscillating lever 8 via a transmission linkage (with transmission bolt) arranged within the shaft 7 of the gearshift lever 1. The oscillating lever 8 is pivotably fastened to the gearshift lever 1 in the lower area of the gearshift lever shaft 7 by means of a bolt 9. The bushes 10 recognizable above the oscillating lever 8 represent the mount of the gearshift lever 1, about which the pivoting motion 2 of the gearshift lever 1 takes place according to FIG. 1.

In the middle area of its legs 11, the oscillating lever 8 has an elongated hole 12 each, through which passes a transmission bolt, which is in turn connected to the lower end of the transmission linkage in the gearshift lever shaft 7. The transmission means thus formed causes the oscillating lever 8 to be pivoted downward via the transmission linkage, the transmission bolt and the elongated holes 12 when the pushbutton 5 arranged in the lever knob 4 is pressed.

In the area of its transverse leg located opposite the pivot axis 9, the oscillating lever 8 carries a permanent magnet 13, which is used to trigger the signal transmitter 6 of the actuating device, which said signal transmitter is designed as a magnetic sensor or as a Hall sensor.

In the representation according to FIG. 3, the pushbutton 5 is shown in the pressed position, as a result of which the permanent magnet 13 of the oscillating lever 8 is brought into the area of the magnetic sensor 6 via the transmission linkage, the transmission bolt, the elongated hole 12 and the oscillating lever 8. As a result, the magnetic sensor 6 triggers an electric or electronic signal, which can be transmitted to the corresponding switching receiver.

From this arises the advantage according to the present invention, which is, in particular, that both the signal transmitter 6 and the cabling (not shown here) to the signal transmitter 6 can be arranged rigidly and in an optimally protected manner in the base area 3 of the actuating device. Damage to the signal transmitter 6 or a moving cable connection led to a signal transmitter, as they can be found in the state of the art, is ruled out in this manner thanks to the present invention.

The other signal transmitters 14 recognizable in FIGS. 2 and 3 are used to recognize the position of the gearshift lever 1 and to generate the corresponding electrical or electronic switching signals.

The gearshift lever 1 shown in FIGS. 1 through 3 is a gearshift lever that automatically returns into the middle position after each actuation. At its lower end, the gearshift lever 1 has for this purpose a functional contour 15, which meshes with a spring-loaded roller 16 in such a way that the gearshift lever 1 always returns into the upright middle position after being released due to the spring action of the leaf spring 17 connected to the roller 16.

Figure 5:
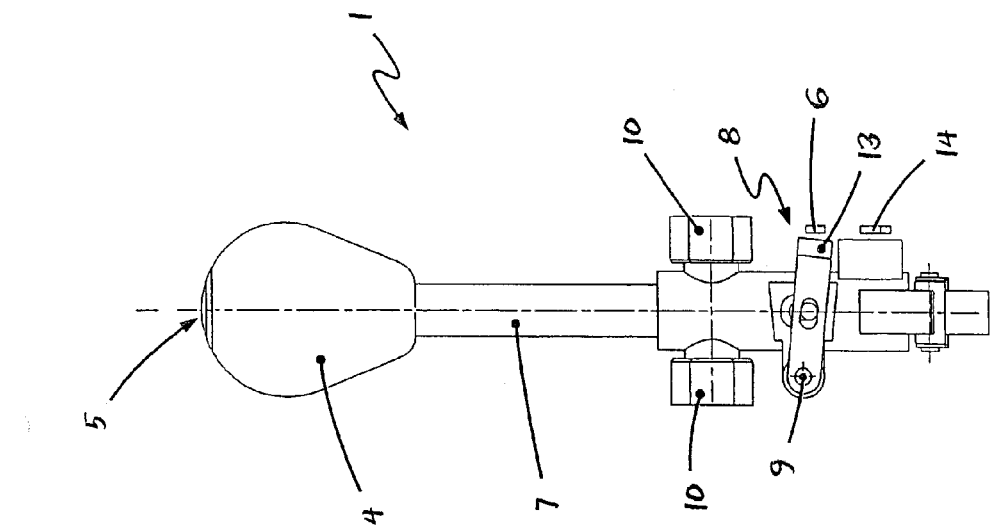
FIG. 5 is a schematic rear view of the actuating device according to FIGS. 1 through 4 in the actuated position of the additional switching element.
Figure 4:
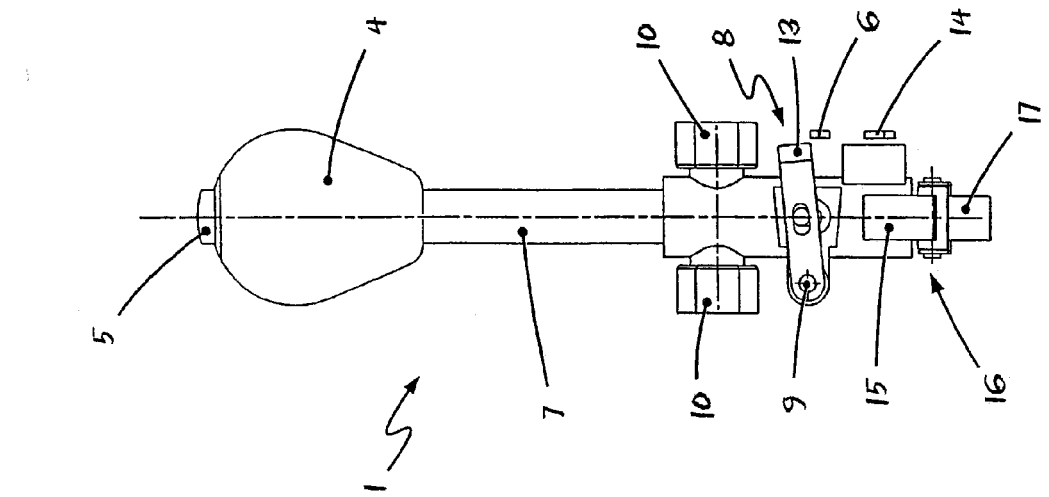
FIG. 4 is a schematic rear view of the actuating device according to FIGS. 1 through 3.
Figure 10:
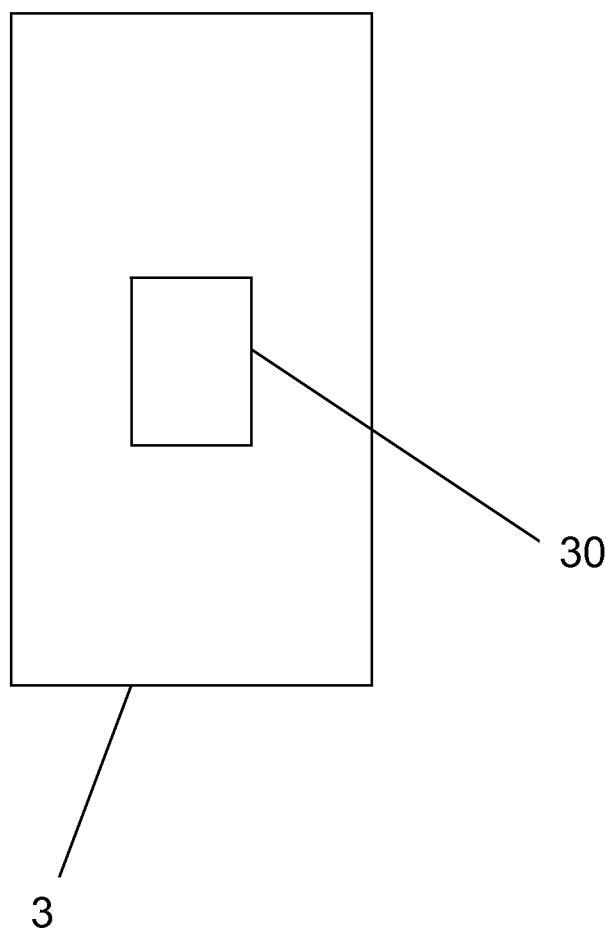

FIGS. 4 and 5 show the actuating device according to FIGS. 1 through 3 once again in a rear view (relative to the direction of travel of a motor vehicle equipped with the actuating device). FIG. 4 shows the pushbutton 5, the transmission linkage and the oscillating lever 8 in the neutral position, while the same elements are shown in the actuated position in FIG. 5.

It becomes recognizable from a comparison of FIG. 4 and FIG. 5 that when the pushbutton 5 is pressed down, the oscillating lever 8 is also moved downward, as a result of which the permanent magnet 13 of the oscillating lever is brought into the immediate vicinity of the magnetic sensor or signal transmitter 6. The switching signal associated with the actuation of the pushbutton 5 is triggered and transmitted in this way in a contactless manner.

FIGS. 6 through 9 show another embodiment of an actuating device according to the present invention. The actuating device shown in FIGS. 6 through 9 is likewise related to the actuation of a shift-by-wire speed-change gear or an automatic transmission of a motor vehicle.

The embodiment according to FIGS. 6 through 9 differs from the embodiment according to FIGS. 1 through 5 especially in that the transmission of the switching signal from the pushbutton 5 to the signal transmitter, which is designed as a microswitch 18 here, does not take place in a contactless manner in the embodiment according to FIGS. 6 through 9, but rather by means of a transmission pin 19 connected to the transmission linkage. FIGS. 6 and 8 show the pushbutton 5, the transmission linkage, the microswitch 18 and the transmission pin 19, each in the non-actuated neutral position, while FIGS. 7 and 9 show the situation in case of actuation of the pushbutton 5.

In the embodiment shown in FIGS. 6 through 9, the microswitch 18 and the transmission pin 19 are designed such that triggering of the microswitch 18 can take place in the neutral position of the gearshift lever 1 only. However, the transmission pin 19 or the trigger 20 of the microswitch 18 may also be readily designed such that transmission of the switching signals from the pushbutton 5 can also take place in the actuated position of the gearshift lever 1, which is a position deflected from the middle position.

Either the transmission pin 19 of the transmission linkage or the trigger 20 of the microswitch 18—or even both elements 19 and 20—may be provided for this purpose, for example, with a trigger skid (not shown), which permits the transmission of the switching signal from the pushbutton 5 to the microswitch 18 regardless of the instantaneous relative angular position between the actuating lever 1 and the base area 3 or between the actuating lever 1 and the microswitch 18 fastened to the base area.

FIGS. 6 and 7 show, furthermore, again a magnetic sensor arrangement 14, which is used, together with a permanent magnet arranged in the lower area of the gearshift lever 1, to detect the respective instantaneous position of the gearshift lever 1. FIGS. 6 through 9 show, furthermore, a function contour 15, which is connected to the lower end of the gearshift lever 1 and which ensures, together with the spring-loaded roller 16, that the gearshift lever 1 will return into the middle position after each shifting actuation.

Thus, it becomes clear as a result that the present invention provides for an actuating device for technical systems and especially for speed-change gears of motor vehicles, in which an additional switching element arranged at the actuating element can be designed as an especially robust switching element subject to little disturbance. In particular, the drawbacks known from the state of the art concerning the delicate cabling to the additional switching element as well as concerning the insufficient protection of the contact maker associated with the exposed arrangement are eliminated with the present invention. Thus, the present invention makes a contribution to the permanently reliable operability of technical systems, especially in case of application in the area of motor vehicle systems and the actuation of transmissions.

While specific embodiments of the invention have been shown and described in detail to illustrate the application of the principles of the invention, it will be understood that the invention may be embodied otherwise without departing from such principles.

The invention claimed is:
1. An actuating device for a technical system, the actuating device comprising:

an actuating element moveable relative to a base area along a path and with at least two switching positions, said actuating element comprising a gearshift lever and an actuating element pivot axis;

a switching element;

a signal transmission device, said switching element and said signal transmission device being disposed on said actuating element; and a signal transmitter connected to said base area, said switching element and said signal transmission device being connected by a mechanical transmission means such that said signal transmission device moves independent of a relative position of said gearshift lever throughout said path and interacts with said signal transmitter when said at least one switching element is actuated for transmitting a switching signal from said switching element to said signal transmitter, said mechanical transmission means including a pivotable portion pivotably connected to said gearshift lever, said pivotable portion pivoting about an axis that is substantially perpendicular to said actuating element pivot axis, said pivotable portion being located at an axially spaced location from said switching element.

2. An actuating device in accordance with claim 1, wherein said signal transmitter is a Hall sensor, said switching element being mounted for movement such that said switching element moves between a non-actuated position and an actuated position, said signal transmitter being located opposite said signal transmission device with said switching element in said actuated position, said signal transmitter being within a signal transmitting range of said signal transmitter with said switching element in said actuated position, said signal transmitter being located at a position outside of said signal transmitting range of said signal transmitter with said switching element in said non-actuated position.

3. An actuating device in accordance with claim 2, wherein said pivotable portion comprises a pivotable lever, said pivotable lever being pivotably connected to said selector lever such that said pivotable lever moves relative to said actuating element, said pivotable lever being movable independent of the position of said gearshift lever, said pivotable lever comprising a first leg, a transverse leg and a second leg, said first leg being connected to said second leg via said transverse leg, said transverse leg being substantially parallel to a pivoting direction of said selector lever, said pivotable lever being mounted for movement such that said pivotable lever moves between a first position and a second position, said switching element being mounted for movement such that said switching element moves between said non-actuated position and said actuated position, said transverse leg being located at a spaced location from said signal transmitter with said pivotable lever in said first position and said switching element in said non-actuated position, said transverse leg being located opposite said signal transmitter with said pivotable lever in said second position and said switching element in said actuated position.

4. An actuating device in accordance with claim 1, wherein said signal transmitter is an optical sensor.

5. An actuating device in accordance with claim 1, wherein said signal transmitter is a microswitch, said signal transmission device being in contact with said microswitch with said switching element in said actuated position.

6. An actuating device in accordance with claim 1, wherein said mechanical transmitting means transmits a movement of said switching element to a larger movement of said signal transmission device.

7. An actuating device in accordance with claim 1, wherein said switching element is a pushbutton or a push switch.

8. An actuating device in accordance with claim 1, wherein said switching element engages position P of an automatic transmission of a motor vehicle.

9. An actuating device in accordance with claim 1, wherein said switching element starts and/or stops an engine of a motor vehicle.

10. An actuating device for a technical system, the actuating device comprising:

an actuating element moveable relative to a base area along a path and with at least two switching positions, said actuating element comprising a lever shaft and a longitudinal actuating element axis;

a switching element, said switching element being arranged on said actuating element for movement therewith, said switching element being movable relative to said actuating element into at least two switching element switching positions;

a signal transmission means on said actuating element;

a mechanical linkage between said switching element and said signal transmission means for changing a position of said signal transmission means corresponding to said switching element switching positions, said signal transmission means being movable, independent of a position of said lever shaft throughout said path, via said mechanical linkage when said switching element moves from one of said at least two switching element switching positions to another one of said at least two switching element switching positions, said mechanical linkage comprising a mechanical linkage pivot axis, said mechanical linkage pivot axis being offset with respect to said longitudinal actuating element axis, said mechanical linkage pivot axis being substantially perpendicular to said longitudinal actuating element axis, at least a portion of said mechanical linkage being pivotably connected to said lever shaft, said portion of said mechanical linkage being pivotable about said mechanical linkage pivoting axis, relative to said lever shaft, from a first position to a second position, wherein said mechanical linkage transmits a movement of said switching element to a larger movement of said signal transmission means, said at least said portion of said mechanical linkage being located at an axially spaced location from said switching element with respect to said longitudinal actuating element axis; and a signal transmitter connected to said base area, said signal transmitter wirelessly interacting with said signal transmission means for signal transmission between said signal transmission means and said signal transmitter with said switching element in said one of said at least two switching element switching positions, said signal transmission means being located at a spaced location from said signal transmitter with said switching element in said another one of said switching element switching positions.

11. An actuating device in accordance with claim 10, wherein said signal transmitter is one or more of a Hall sensor and an optical sensor, said signal transmitter means being located opposite said signal transmitter with said switching element in said one of said at least two switching element switching positions, said signal transmitter means being within a signal transmitting range of said signal transmitter with said switching element in said one of said at least two switching element switching positions, said signal transmitter means being located at a position outside of said signal transmitting range of said signal transmitter with said switching element in said another one of said switching element switching positions.

12. An actuating device in accordance with claim 10, wherein said mechanical linkage comprises a pivotable lever, said pivotable lever comprising a first leg, a transverse leg and a second leg, said first leg being connected to said second leg via said transverse leg, said pivotable lever being mounted to said actuating element for movement such that said pivotable lever moves, independent of the position of said lever shaft, between a first position and a second position, said transverse leg being located at a spaced location from said signal transmitter with said pivotable lever in said first position and said switching element in said one of said at least two switching element switching positions, said transverse leg being located opposite said signal transmitter with said pivotable lever in said second position and said switching element in said another one of said switching element switching positions.

13. An actuating device in accordance with claim 10, wherein said switching element is a pushbutton provided on said selector lever.

14. An actuating device in accordance with claim 13, wherein one of said switching element switching positions of said switching element engages a park position P of the motor vehicle transmission of a motor vehicle.

15. An actuating device in accordance with claim 13, wherein one of said switching element switching positions of said switching element starts and/or stops the engine of a motor vehicle.

16. An actuating device in accordance with claim 10, wherein said mechanical linkage comprises a pivotable lever, said pivotable lever comprising a first leg, a transverse leg and a second leg, said first leg being connected to said second leg via said transverse leg, said pivotable lever being mounted to said actuating element for movement such that said pivotable lever moves, independent of the position of said lever shaft, between a first position and a second position, said transverse leg being located at a spaced location from said signal transmitter with said pivotable lever in said first position and said switching element in said one of said at least two switching element switching positions, said transverse leg being located opposite said signal transmitter with said pivotable lever in said second position and said switching element in said another one of said switching element switching positions, wherein a magnet is arranged on said transverse leg, said transverse leg being substantially parallel to a pivoting direction of said actuating element.

17. An actuating device for a technical system, the actuating device comprising:
  a motor vehicle selector lever base;
  a motor vehicle transmission selector lever moveable relative to said lever base, said selector lever having at least two switching positions;
  a switching element mounted on said selector lever for movement therewith along a path, said switching element being movable relative to said selector lever into at least two switching element switching positions, said switching element comprising a switching element longitudinal axis;
  a signal transmission means located on said actuating element;
  a mechanical linkage between said switching element and said signal transmission means for changing a position of said signal transmission means corresponding to said switching element switching positions, said mechanical linkage comprising a pivotable lever comprising a pivotable lever axis pivotably connected to said selector lever at a position located below said switching element, said pivotable lever axis being substantially perpendicular to said switching element longitudinal axis, said pivotable lever pivoting axis being offset from said switching element longitudinal axis, said pivotable lever pivoting about said pivotable lever axis upon actuation of said switching element; and
  a signal transmitter connected to said lever base, said signal transmitter interacting with said signal transmission means for wireless signal transmission between said signal transmission means and said signal transmitter based on said position of said signal transmission means, wherein said signal transmission means is moved into and out of a signal transmission range of said signal transmitter, independent of a position of said motor vehicle transmission selector lever throughout said path, via said mechanical linkage.

18. An actuating device in accordance with claim 17, wherein said pivotable lever comprises a first leg, a transverse leg and a second leg, said first leg being connected to said second leg via said transverse leg, said pivotable lever being mounted to said motor vehicle transmission selector lever for movement such that said pivotable lever moves, independent of the position of said motor vehicle transmission selector lever, between a first position and a second position, said transverse leg being located at a spaced location from said signal transmitter with said pivotable lever in said first position and said switching element in said one of said at least two switching element switching positions, said transverse leg being located opposite said signal transmitter with said pivotable lever in said second position and said switching element in said another one of said switching element switching positions, wherein a magnet is connected to said transverse leg, said transverse leg being substantially parallel to a pivoting direction of said actuating element.

19. An actuating device in accordance with claim 17, wherein said pivotable lever comprises a first leg, a transverse leg and a second leg, said first leg being connected to said second leg via said transverse leg, said transverse leg being substantially parallel to a pivoting direction of said selector lever.

20. An actuating device in accordance with claim 17, wherein said pivotable lever is fastened to a lower area of said selector lever.

* * * * *